(12) United States Patent
Wang et al.

(10) Patent No.: US 10,027,360 B2
(45) Date of Patent: *Jul. 17, 2018

(54) SIM CARD CONNECTORFOR PREVENTING SIM CARD BURNOUT BY DETECTING INSERTION AND REMOVAL OF THE SIM CARD

(71) Applicant: Huawei Device (Dongguan) Co., Ltd., Dongguan (CN)

(72) Inventors: Xiaolong Wang, Shanghai (CN); Wei Lv, Shenzhen (CN); Haifeng Zhu, Shenzhen (CN); Weibin Lai, Shenzhen (CN); Huaya He, Shenzhen (CN)

(73) Assignee: Huawei Device (Dongguan) Co., Ltd., Dongguan (CN)

( * ) Notice: Subject to any disclaimer, the term of this patent is extended or adjusted under 35 U.S.C. 154(b) by 11 days.

This patent is subject to a terminal disclaimer.

(21) Appl. No.: 15/306,327

(22) PCT Filed: Apr. 25, 2014

(86) PCT No.: PCT/CN2014/076234
§ 371 (c)(1),
(2) Date: Oct. 24, 2016

(87) PCT Pub. No.: WO2015/161509
PCT Pub. Date: Oct. 29, 2015

(65) Prior Publication Data
US 2017/0047958 A1    Feb. 16, 2017

(51) Int. Cl.
*H04B 1/3818* (2015.01)
*G06K 7/00* (2006.01)
*H01R 13/713* (2006.01)

(52) U.S. Cl.
CPC ......... *H04B 1/3818* (2015.01); *G06K 7/0021* (2013.01); *G06K 7/0069* (2013.01); *H01R 13/713* (2013.01)

(58) Field of Classification Search
CPC .. G06K 7/0069; G06K 7/0021; H04B 1/3818; H04B 1/3816; H01R 13/713; G06F 13/4081; H02H 9/004
See application file for complete search history.

(56) References Cited

U.S. PATENT DOCUMENTS 5,699,406 A * 12/1997 Liikanen ............. G06K 7/0021
379/357.01
5,733,147 A * 3/1998 Verstijnen ............ G06K 7/0021
235/441

(Continued)

FOREIGN PATENT DOCUMENTS

CN        2488198 Y      4/2002
CN      200969416 Y     10/2007
(Continued)

OTHER PUBLICATIONS

U.S. Appl. No. 15/306,451, entitled "Sim Card Connector and Mobile Terminal Having the Sim Card Connector"; filed Oct. 24, 2016.

*Primary Examiner* — Devan Sandiford

(57) ABSTRACT

A SIM card connector includes a base, signal spring, a detection apparatus, and a controller. The detection apparatus is configured to cooperate with one side of a SIM card, and includes a fixed contact and a detection spring, where an action of the SIM card can be detected by separation or union between the fixed contact and the detection spring. The controller can disconnect a power supply of the signal spring before the SIM card is separated from the signal spring, and can switch on the power supply of the signal spring after the SIM card presses against the signal spring, which effectively prevents the SIM card from being burned out by a momentary electric arc generated between the SIM card and the signal spring when the SIM card is being inserted or removed.

13 Claims, 4 Drawing Sheets

(56) References Cited

U.S. PATENT DOCUMENTS

| | | | | |
|---|---|---|---|---|
| 6,409,529 | B1* | 6/2002 | Liu | H01R 13/2442 439/188 |
| 6,557,761 | B1* | 5/2003 | Oya | G06K 7/0069 235/441 |
| 6,688,899 | B2* | 2/2004 | Rumpel | G06K 7/0021 439/188 |
| 6,814,597 | B1* | 11/2004 | Kao | H01R 13/633 439/155 |
| 7,354,285 | B1* | 4/2008 | Lin | H04B 1/3818 439/159 |
| 7,357,678 | B1* | 4/2008 | Lee | H01R 13/2442 439/188 |
| 2003/0049968 | A1* | 3/2003 | Nogami | G06K 7/0021 439/630 |
| 2003/0227763 | A1* | 12/2003 | Kao | G06K 7/0021 361/818 |
| 2009/0149047 | A1* | 6/2009 | Yu | G06K 7/0047 439/135 |
| 2010/0062646 | A1* | 3/2010 | Matsumoto | G06K 7/0021 439/629 |
| 2010/0091455 | A1* | 4/2010 | Tang | H04B 1/3816 361/679.58 |
| 2010/0327851 | A1* | 12/2010 | Takahashi | G06K 7/0069 324/126 |
| 2014/0101466 | A1* | 4/2014 | Itakura | G06K 13/0806 713/300 |
| 2015/0093938 | A1* | 4/2015 | Tang | G06F 13/4068 439/620.21 |
| 2015/0111413 | A1* | 4/2015 | Jiang | G06K 7/0069 439/370 |
| 2017/0047958 | A1 | 2/2017 | Wang et al. | |
| 2017/0054462 | A1* | 2/2017 | Wang | G06F 13/4081 |

FOREIGN PATENT DOCUMENTS

| | | |
|---|---|---|
| CN | 102123205 A | 7/2011 |
| CN | 102420894 A | 4/2012 |
| CN | 202196962 U | 4/2012 |
| CN | 102709725 A | 10/2012 |
| CN | 102843449 A | 12/2012 |
| CN | 102945189 A | 2/2013 |
| CN | 103001075 A | 3/2013 |
| CN | 103094793 A | 5/2013 |
| CN | 103220411 A | 7/2013 |
| CN | 203167011 U | 8/2013 |
| CN | 203398388 U | 1/2014 |
| CN | 203456616 U | 2/2014 |
| DE | 10051693 A1 | 5/2002 |
| EP | 1148694 A1 | 10/2001 |

* cited by examiner

SIM CARD CONNECTOR FOR PREVENTING SIM CARD BURNOUT BY DETECTING INSERTION AND REMOVAL OF THE SIM CARD

CROSS REFERENCE TO RELATED APPLICATIONS

The present application claims priority under 35 U.S.C. § 365 to International Patent Application No. PCT/CN2014/076234 filed Apr. 25, 2014 which is incorporated herein by reference in its entirety.

TECHNICAL FIELD

The present invention relates to the field of mobile communications devices, and in particular, to a SIM card connector and a mobile terminal having the SIM card connector.

BACKGROUND

For an existing SIM card connector, in a case in which a battery is not pulled out, when a user takes a SIM card out of or puts a SIM card into the SIM card connector that is in a power-on state, a card burnout phenomenon is likely to occur. A reason is that the SIM card connector is still in the power-on state when the customer performs a card insertion or removing action, and in this case, hot swap causes a momentary electric arc to be generated between a gold plated area of the SIM card and signal spring. Consequently, a contact area is burned out, and the card cannot be read when the customer uses a mobile phone.

SUMMARY

The present invention provides a SIM card connector and a mobile terminal having the SIM card connector, which can prevent a SIM card from being burned out when the card is being inserted or removed.

According to one aspect, a SIM card connector is provided, including a base and signal spring, where: the base has a bearer panel parallel to a SIM card, and the signal spring is disposed on the base; the SIM card connector further includes a detection apparatus and a controller, where the detection apparatus is configured to cooperate with one side of the SIM card, and is configured to detect an action of the SIM card, and the controller is electrically connected to the detection apparatus, and is electrically connected to a power supply circuit of the signal spring; the detection apparatus includes a fixed contact and a detection spring, where: the fixed contact is secured to the base, the detection spring is strip-shaped, a first end of the detection spring is secured to the base, a second end of the detection spring performs clutch cooperation with the fixed contact by means of elastic deformation of the detection spring, and a moving direction of separation or union of the second end of the detection spring is parallel to the bearer panel; and a trigger part is disposed on one side, close to the SIM card, of the detection spring, and when the signal spring is in a free state, in a direction perpendicular to the bearer panel, compared with the signal spring, the trigger part is closer to the bearer panel; and the trigger part can press against one side of the SIM card to move the second end of the detection spring, so that the controller changes a connectivity status of the power supply circuit of the signal spring.

In a first possible implementation manner, the signal spring has a pressing part, and the pressing part is configured to elastically press against the SIM card; and that compared with the signal spring, the trigger part is closer to the bearer panel specifically includes that compared with the pressing part, the trigger part is closer to the bearer panel.

With reference to the first possible implementation manner, in a second possible implementation manner, when the SIM card presses against the pressing part, and the SIM card performs gap cooperation with the trigger part, the second end of the detection spring and the fixed contact are in a first cooperation state, and the power supply circuit of the signal spring is in a disconnected state under control of the controller; and when the SIM card presses against the pressing part, and the SIM card presses against the trigger part, the second end of the detection spring and the fixed contact are in a second cooperation state, and the power supply circuit of the signal spring is connected under control of the controller; where when the first cooperation state is that the second end of the detection spring presses against the fixed contact, the second cooperation state is correspondingly that the second end of the detection spring is separated from the fixed contact; or when the first cooperation state is that the second end of the detection spring is separated from the fixed contact, the second cooperation state is correspondingly that the second end of the detection spring presses against the fixed contact.

With reference to any one of the foregoing implementation manners, in a third possible implementation manner, when the fixed contact is grounded, the detection spring is electrically connected to the controller; or when the fixed contact is electrically connected to the controller, the detection spring is grounded.

With reference to any one of the foregoing implementation manners, in a fourth possible implementation manner, a protection board is further disposed on the base, the detection spring is located between the SIM card and the protection board, and the protection board performs gap cooperation with the second end of the detection spring.

With reference to any one of the foregoing implementation manners, in a fifth possible implementation manner, the detection spring is disposed extending along an edge of the end of the SIM card connector.

With reference to any one of the foregoing implementation manners, in a sixth possible implementation manner, the trigger part is a convex hull.

With reference to any one of the foregoing implementation manners, in a seventh possible implementation manner, an exterior surface of the trigger part is a spherical surface.

With reference to any one of the foregoing implementation manners, in an eighth possible implementation manner, the trigger part is located in a middle position, in a length direction, of the detection spring.

With reference to any one of the foregoing implementation manners, in a ninth possible implementation manner, a part in a position in which the trigger part is disposed on the detection spring is arched toward one side of the SIM card connector.

With reference to any one of the foregoing implementation manners, in a tenth possible implementation manner, the SIM card connector further includes a flip, and the flip is connected to the base in a rotating manner, and is configured to tightly lock the SIM card to the base.

According to another aspect, a mobile terminal is provided, where the mobile terminal has the SIM card connector according to any one of the foregoing implementation manners.

In a first possible implementation manner, a controller of the SIM card connector is a processor of the mobile terminal.

According to the SIM car connecter and the mobile terminal having the SIM card connector in the present invention, in a process of removing or inserting a SIM card, the SIM card can move a second end of a detection spring to trigger a change in separation and union between the detection spring and a fixed contact. By using a controller, a power supply of signal spring can be disconnected before the SIM card is separated from the signal spring, and the power supply of the signal spring can be switched on after the SIM card presses against the signal spring. The controller switches on or off the power supply in a timely manner, which effectively prevents the SIM card from being burned out by a momentary electric arc generated between the SIM card and the signal spring when the SIM card is being inserted or removed.

BRIEF DESCRIPTION OF THE DRAWINGS

To describe the technical solutions in the present invention more clearly, the following briefly describes the accompanying drawings required for describing the implementation manners. Apparently, the accompanying drawings in the following description show merely some implementation manners of the present invention, and a person of ordinary skill in the art may still derive other drawings from these accompanying drawings without creative efforts.

DETAILED DESCRIPTION

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
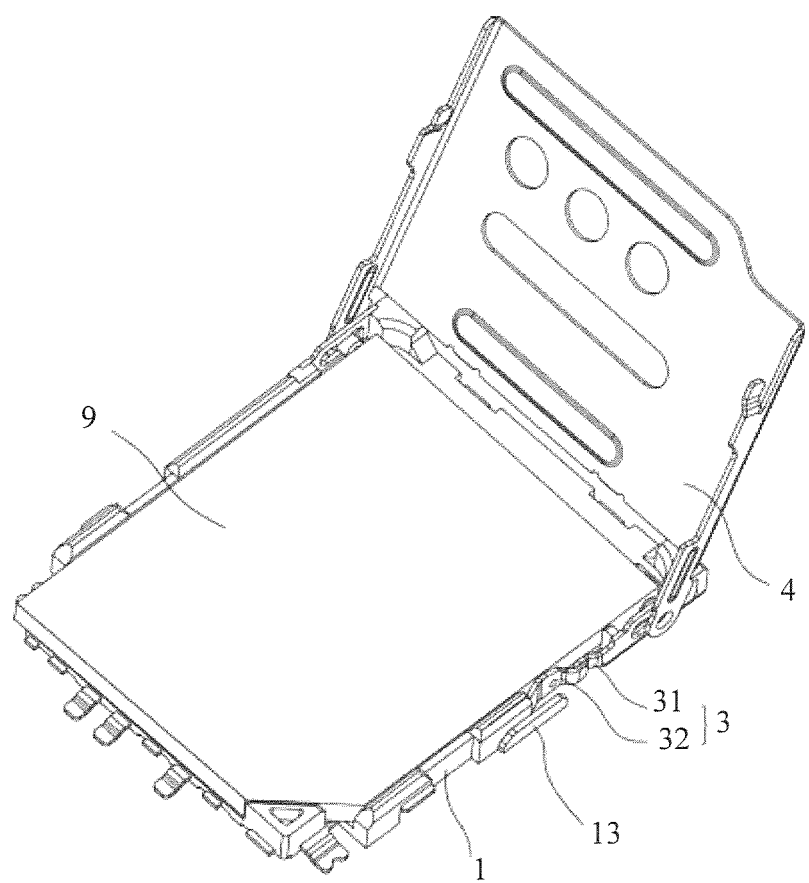
FIG. 1 is schematic diagram of a SIM card connector equipped with a SIM card according to an implementation manner of the present invention.
Figure 2:
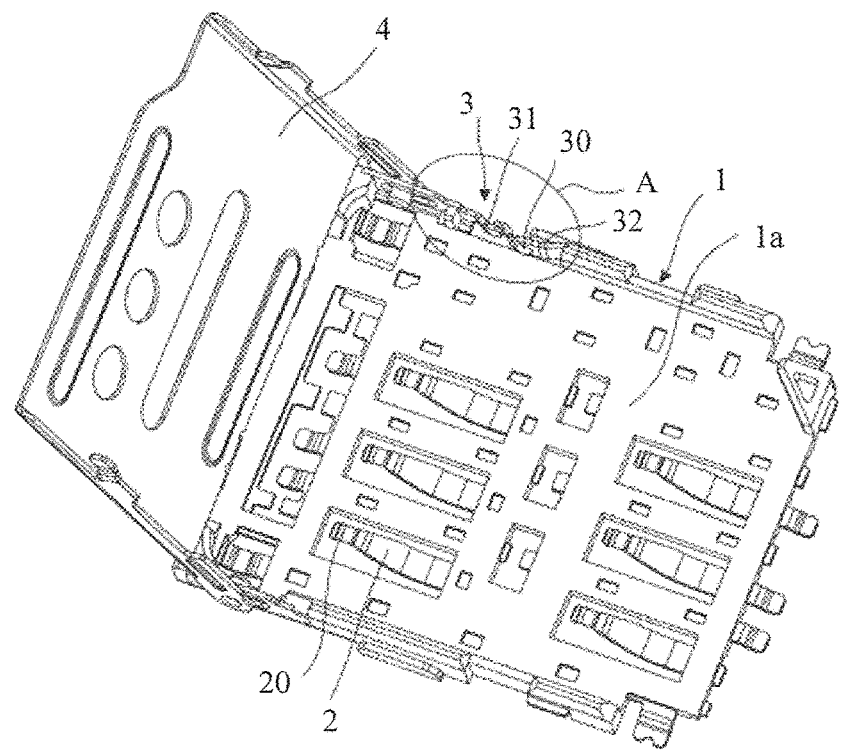
FIG. 2 is a schematic diagram of the SIM card connector in FIG. 1.

An embodiment of the present invention provides a mobile terminal that has a SIM card connector. As shown in FIG. 1 and FIG. 2, the SIM card connector includes a base 1, signal spring 2, a detection apparatus 3, and a controller (not shown in the figure). The signal spring 2 is disposed on the base 1, is connected to a power supply module (not shown in the figure), and is configured to read information from or write information into a SIM card 9. The detection apparatus 3 is configured to detect an action of the SIM card 9. The controller is electrically connected to the detection apparatus 3, and is electrically connected to a power supply circuit of the signal spring 2. The controller changes a connectivity status of the power supply circuit of the signal spring 2 according to a status of the detection apparatus 3.

The base 1 has a bearer panel 1a parallel to the SIM card 9, the signal spring 2 has a pressing part 20, and the pressing part 20 is configured to elastically press against the SIM card 9. After the SIM card 9 is inserted, pressing parts 20 of multiple signal springs 2 can press against the SIM card 9 at the same time to read information from the SIM card 9 and write information into the SIM card 9.

As shown in FIG. 1 to FIG. 6, the detection apparatus 3 is located on one side of the SIM card connector, and is configured to cooperate with the one side of the SIM card 9 to detect an action of the SIM card 9. The detection apparatus 3 includes a fixed contact 31 and a detection spring 32, and an action of the SIM card 9 can be detected by clutch cooperation between the fixed contact 31 and the detection spring 32. The clutch cooperation described in the present invention means that the detection spring 32 can be changed from pressing against the fixed contact 31 to being separated from the fixed contact 31 or in the other way around. In this embodiment, both the fixed contact 31 and the detection spring 32 are made of conductive materials, for example, a metal piece, which helps detect a clutch status between the fixed contact 31 and the detection spring 32.

The fixed contact 31 is secured to the base 1. In this embodiment, the fixed contact 31 is grounded, that is, the fixed contact is electrically connected to GND (ground), and the detection spring 32 is electrically connected to the controller. More specifically, a first end of the detection spring 32 is electrically connected to the controller, so as to facilitate connection between the detection spring 32 and the controller. When the detection spring 32 presses against the fixed contact 31, electric potential of the detection spring 32 is in a grounded state. When the detection spring 32 is separated from the fixed contact 31, electric potential of the detection spring 32 is raised. The detection spring 32 is electrically connected to the controller, and by detecting a change in the electric potential of the detection spring 32, the controller can determine the clutch status between the detection spring 32 and the fixed contact 31. Certainly, in another implementation manner, the detection spring 32 is grounded, that is, electrically connected to the GND, and correspondingly, the fixed contact 31 is electrically connected to the controller; the clutch status between the detection spring 32 and the fixed contact 31 is determined by detecting a change in electric potential of the fixed contact 31. In still another implementation manner, the fixed contact 31 may be connected to the detection spring 32 and the controller to form a loop, and the controller can determine the clutch status between the fixed contact 31 and the detection spring 32 according to connection or disconnection of the loop.

The detection spring 32 is strip-shaped. In this embodiment, the detection spring 32 is disposed extending along an edge of an end of the SIM card connector, so as to facilitate configuration of the detection spring 32, make a whole structure of the SIM card compact, and reduce space occupied by the SIM card connector. The first end of the detection spring 32 is secured to the base 1, and a second end of the detection spring 32 performs clutch cooperation with the fixed contact 31 by means of elastic deformation of the detection spring 32. A moving direction of separation or union of the second end of the detection spring 32 is parallel to the bearer panel 1a. A trigger part 30 is disposed on a side, close to the SIM card 9, of the detection spring 32. The trigger part 30 can press against the end of the SIM card 9 to move the second end of the detection spring 32, so that the controller changes the connectivity status of the power supply circuit of the signal spring 2 to avoid an electric arc. When the trigger part 30 presses against the end of the SIM card 9 to move the second end of the detection spring 32, the detection spring 32 and the fixed contact 31 change the clutch status, that is, the two change from pressing against each other to being separated from each other, or change from being separated from each other to pressing against each other.

Figure 5:
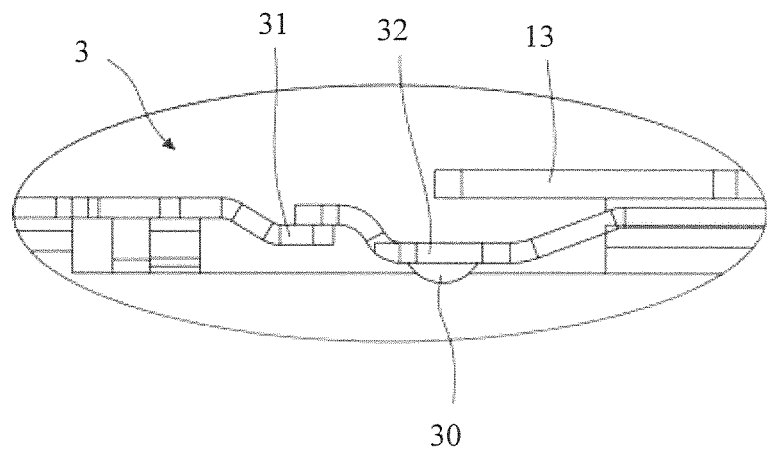
FIG. 5 is an enlarged diagram of an area B of the SIM card connector in FIG. 4.
Figure 7:
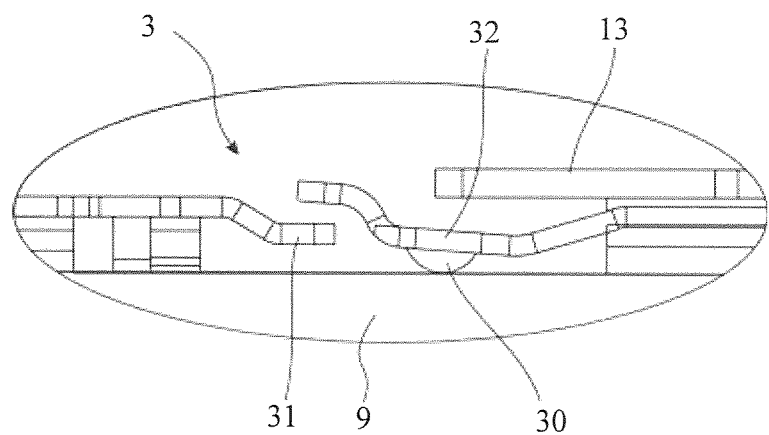
FIG. 7 is a schematic diagram of the SIM card connector in FIG. 5 inserted with a SIM card.

As shown in FIG. 5 and FIG. 7, compared with the second end of the detection spring 32, the fixed contact 31 is closer to the SIM card 9. When the end of the SIM card 9 presses against the trigger part 30, the second end of the detection spring 32 moves in a direction away from the SIM card 9 and is separated from the fixed contact 31; when a force of the SIM card 9 acting on the trigger part 30 is withdrawn, with resilience of the detection spring 32, the second end of the detection spring 32 moves back in a direction close to the SIM card 9 and presses against the fixed contact 31.

A protection board 13 is further disposed on the base 1. The detection spring 32 is located between the SIM card 9 and the protection board 13. The protection board 13 performs gap cooperation with the second end of the detection spring 32, which can reserve moving space for the second end of the detection spring 32, and avoid interference between moving of the second end of the detection spring 32 and another component of the mobile terminal.

Figure 3:
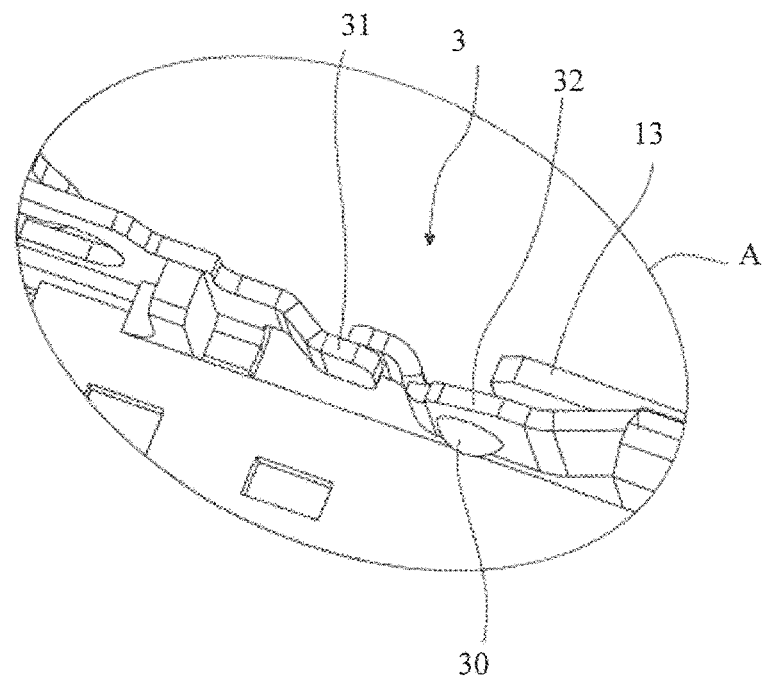
FIG. 3 is an enlarged diagram of an area A of the SIM card connector in FIG. 2.
Figure 4:
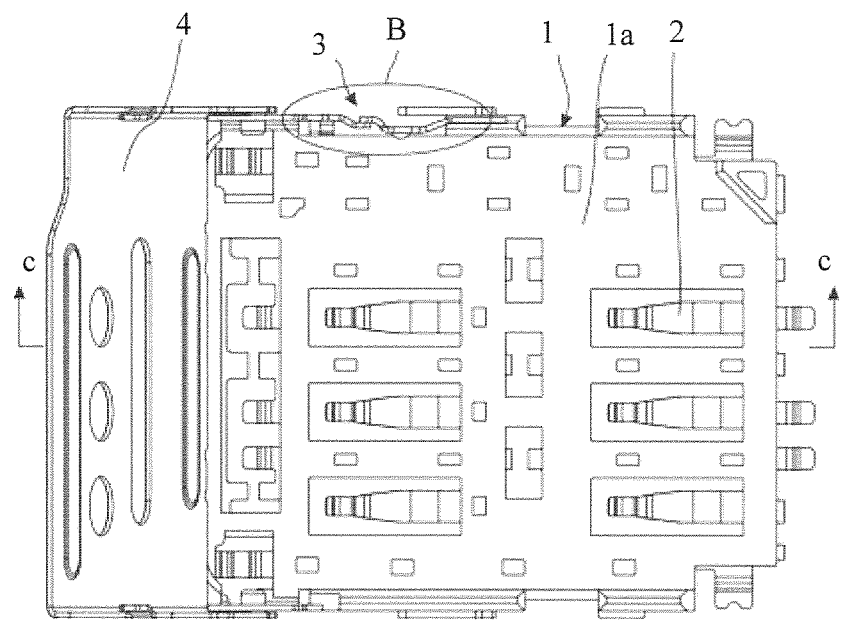
FIG. 4 is a top view of orthographic projection of the SIM card connector in FIG. 2.

As shown in FIG. 3, the trigger part 30 is a convex hull, which helps press against the SIM card 9. Further, an exterior surface of the trigger part 30 is a spherical surface, so that the end of the SIM card 9 moves from the bottom of the convex hull to the top of the convex hull, and makes the detection spring 32 deform, move, and be separated from the fixed contact 31. The trigger part 30 is located in a middle position, in a length direction, of the detection spring 32, so that a relatively large displacement is generated by the second end of the detection spring 32, which effectively ensures separation of the detection spring 32 from the fixed contact 31. The detection spring 32 is plate-shaped, and the trigger part 30 is formed on the detection spring 32 by means of stamping, which facilitates preparation, processing, and manufacturing.

As shown in FIG. 5, a part in a position in which the trigger part 30 is disposed on the detection spring 32 is arched toward one side of the SIM card connector, so that the trigger part 30 is closer to the SIM card 9, which facilitates pressing cooperation between the SIM card 9 and the trigger part 30, and meanwhile, may reserve space between the second end of the detection spring 32 and the SIM card 9 to dispose the fixed contact 31 and avoid mutual interference between the fixed contact 31 and the SIM card 9.

As shown in FIG. 1 and FIG. 2, the SIM card connector further includes a flip 4, where the flip 4 is connected to the base 1 in a rotating manner, and is configured to tightly lock the SIM card 9 to the base 1, so that the SIM card connector is a flip-type card connector, and the SIM card 9 may be inserted into the base 1 in a direction roughly perpendicular to the bearer panel 1*a*.

Figure 6:
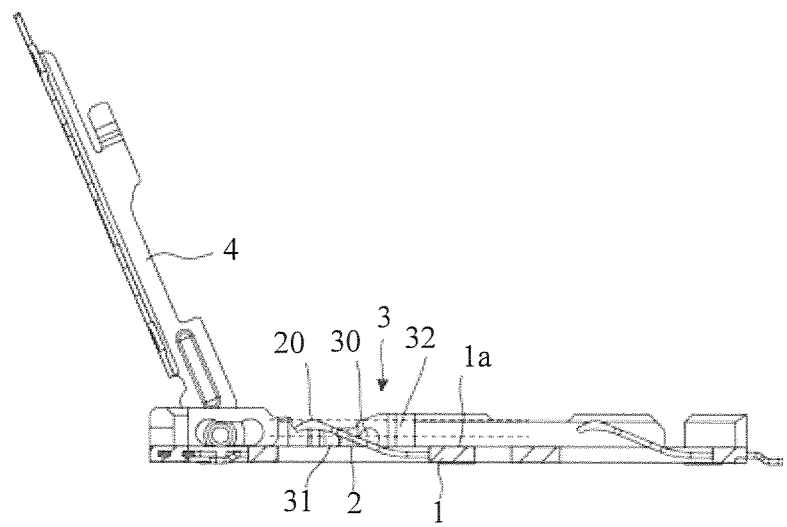
FIG. 6 is a sectional view in a position C-C of the SIM card connector in FIG. 5.

As shown in FIG. 6, when the signal spring 2 is in a free state, in a direction perpendicular to the bearer panel 1*a*, compared with the signal spring 2, the trigger part 30 is closer to the bearer panel 1*a*. The free state described in the present invention refers to a state in which no external force acts on the signal spring 2. More specifically, because the pressing part 20 of the signal spring 2 presses against the SIM card 9, compared with the pressing part 20 of the signal spring 2, the trigger part 30 is closer to the bearer panel 1*a*. When the SIM card 9 is being inserted, the SIM card 9 may first press against the pressing part 20 of the signal spring 2, and then press against the trigger part 30. When the SIM card 9 presses against the pressing part 20, and the SIM card 9 performs gap cooperation with the trigger part 30, the second end of the detection spring 32 and the fixed contact 31 are in a first cooperation state, and the power supply circuit of the signal spring 2 is in a disconnected state under control of the controller. The gap cooperation herein means that the SIM card 9 is not in contact with the trigger part 30. When the SIM card 9 presses against the pressing part 20, and the end of the SIM card 9 presses against the trigger part 30, the second end of the detection spring 32 and the fixed contact 31 are in a second cooperation state, and the power supply circuit of the signal spring 2 is connected under control of the controller. In this embodiment, the first cooperation state is that the second end of the detection spring 32 presses against the fixed contact 31, and the second cooperation state is that the second end of the detection spring 32 is separated from the fixed contact 31.

When the SIM card 9 is not inserted into the SIM card connector, the signal spring 2 is in a free state in which no force acts, the second end of the detection spring 32 and the fixed contact 31 are in a pressing state, so that the detection spring 32 is in a grounded state. The controller sets, according to the state, the power supply circuit of the signal spring 2 to a disconnected state, so that the signal spring 2 is not connected to a power supply. When the SIM card 9 is being inserted into the SIM card connector in a direction perpendicular to the bearer panel 1*a*, because compared with the pressing part 20, the trigger part 30 is closer to the bearer panel 1*a*, the SIM card 9 first presses against the pressing part 20 and performs gap cooperation with the trigger part 30, so that the SIM card 9 is connected to the signal spring 2 that is not connected to the power supply, which avoids generating an electric art that burns out the SIM card 9. Meanwhile, the SIM card 9 may effectively press against the multiple signal springs 2 at the same time in a process in which the SIM card 9 moves from the pressing part 20 to the trigger part 30. Mounting of the SIM card 9 continues. The end of the SIM card 9 presses against the trigger part 30 of the detection spring 32, so that the second end of the detection spring 32 moves and enters a separated state with the fixed contact 31. The electric potential of the detection spring 32 is raised. The controller identifies a high potential signal of the detection spring 32, and controls the power supply circuit of the signal spring 2 to change into a connected state, so as to connect to the power supply of the signal spring 2.

When the SIM card 9 is being removed from the SIM card connector, the SIM card 9 is first separated from the trigger part 30, the detection spring 32 presses against the fixed contact 31, the electric potential of the detection spring 32 is lowered, and the controller controls the power supply circuit of the signal spring 2 to change into a disconnected circuit state, so as to disconnect the power supply of the signal spring 2. In this case, the SIM card 9 still presses against the pressing part 20 of the signal spring 2. Removal of the SIM card 9 continues, and the SIM card 9 may be separated from the pressing part 20 of the signal spring 2. In this case, because the power supply of the signal spring 2 is already disconnected, it can be effectively avoided that the SIM card 9 is burned out by an electric arc generated in a contact area between the SIM card 9 and the signal spring 2.

According to the SIM card connector provided in this embodiment, a detection apparatus is disposed on one side of the SIM card connector, and in a process of removing the SIM card 9 from the SIM card connector, or in a process of inserting the SIM card 9 into the SIM card connector, the SIM card 9 can trigger a change in separation and union between a detection spring 32 and a fixed contact 31. By using a controller, a power supply of signal spring 2 can be disconnected before the SIM card 9 is separated from the signal spring 2, and the power supply of the signal spring 2 can be switched on after the SIM card 9 presses against the signal spring 2. The controller switches on or off the power supply in a timely manner, which effectively prevents the SIM card 9 from being burned out by a momentary electric arc generated between the SIM card 9 and the signal spring 2 when the SIM card 9 is being inserted or removed. The controller may be a processor of the mobile terminal, or may be an independent integrated circuit (IC) or another controller; or the clutch status between the detection spring 32 and the fixed contact 31 may be identified with the help of software.

In the foregoing implementation manner, the fixed contact 31 is located between the SIM card 9 and the second end of the detection spring 32; when the SIM card 9 is not inserted, the second end of the detection spring 32 presses against the fixed contact 31; after the SIM card 9 is inserted, the second end of the detection spring 32 moves in a direction away from the SIM card 9 and then is separated from the fixed contact 31. A first cooperation state is that the second end of the detection spring 32 presses against the fixed contact 31, and a second cooperation state is that the second end of the detection spring 32 is separated from the fixed contact 31. Herein, in another implementation manner, the first cooperation state between the second end of the detection spring 32 and the fixed contact 31 may also be that the second end of the detection spring 32 is separated from the fixed contact 31, and correspondingly, the second cooperation state between the second end of the detection spring 32 and the fixed contact 31 is that the second end of the detection spring 32 presses against the fixed contact 31. In addition, the second end of the detection spring 32 is located between the fixed contact 31 and the SIM card 9. When the SIM card 9 is not inserted, the second end of the detection spring 32 is separated from the fixed contact 31. After the SIM card 9 is inserted, the second end of the detection spring 32 moves in a direction away from the SIM card 9 and then presses against the fixed contact 31. The controller may determine a clutch status between the detection spring 32 and the fixed contact 31 to control in a timely manner connection or disconnection of the power supply of the signal spring 2.

In the foregoing implementation manners, the trigger part 30 is a spherical convex hull. In another implementation manner, the trigger part 30 may be an inclined surface or an arc surface disposed on the detection spring 32. In a direction away from the bearer panel 1a, the inclined surface or the arc surface gradually inclines to a direction away from the SIM card, a convex hull may be disposed on a side, towards one side of the SIM card connector, of the detection spring 32, and the inclined surface or the arc surface is disposed on the convex hull. The inclined surface or the cambered surface may also be disposed on a body of the detection spring 32, for example, the detection spring 32 is disposed in an inclined manner in a direction perpendicular to the bearer panel 1a, the second end of the detection spring 32 inclines towards a side away from the SIM card 9, and the side, close to the SIM card 9, of the detection spring 32 becomes an inclined surface, which may be used as the trigger part 30. A trigger part 30 is acceptable provided that the trigger part 30 can press against the end of the SIM card 9 to move the second end of the detection spring 32 and change a clutch status with the fixed contact 31.

Finally, it should be noted that the foregoing embodiments are merely intended for describing the technical solutions of the present invention but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:
1. A subscriber identity module (SIM) card connector, comprising:
    a base having a bearer panel parallel to a SIM card;
    a signal spring is disposed on the base;
    a detection apparatus configured to cooperate with one side of the SIM card and detect an action of the SIM card, wherein the detection apparatus comprises,
        a fixed contact secured to the base,
        a detection spring having a first end secured to the base and a second end configured to perform clutch cooperation with the fixed contact by means of elastic deformation of the detection spring, and
        a trigger part disposed on one side, close to the SIM card, of the detection spring;
    a controller electrically connected to the detection apparatus and to a power supply circuit of the signal spring, wherein the trigger part is configured to press against one side of the SIM card to move the second end of the detection spring so that the controller changes a connectivity status of the power supply circuit of the signal spring; and
    wherein the signal spring has a pressing part configured to elastically press against the SIM card, the trigger part is closer to the bearer panel than the signal spring, and the trigger part is closer to the bearer panel than the pressing part.

2. The SIM card connector according to claim 1, wherein:
    when the SIM card presses against the pressing part and performs gap cooperation with the trigger part, the second end of the detection spring and the fixed contact are in a first cooperation state, and the power supply circuit of the signal spring is in a disconnected state under control of the controller;
    when the SIM card presses against the pressing part, and the SIM card abuts against the trigger part, the second end of the detection spring and the fixed contact are in a second cooperation state, and the power supply circuit of the signal spring is connected under control of the controller; and
    wherein when the first cooperation state is that the second end of the detection spring presses against the fixed contact, the second cooperation state is correspondingly that the second end of the detection spring is separated from the fixed contact, or,
    when the first cooperation state is that the second end of the detection spring is separated from the fixed contact, the second cooperation state is correspondingly that the second end of the detection spring presses against the fixed contact.

3. The SIM card connector according to claim 1, wherein:
when the fixed contact is grounded, the detection spring is electrically connected to the controller; or
when the fixed contact is electrically connected to the controller, the detection spring is grounded.

4. The SIM card connector according to claim 1, wherein the detection spring is disposed extending along an edge of the end of the SIM card connector.

5. The SIM card connector according to claim 1, wherein the trigger part is a convex hull.

6. The SIM card connector according to claim 5, wherein an exterior surface of the trigger part is a spherical surface.

7. The SIM card connector according to claim 1, wherein the trigger part is located in a middle position, in a length direction, of the detection spring.

8. The SIM card connector according to claim 1, wherein a part in a position in which the trigger part is disposed on the detection spring is arched toward the SIM card.

9. The SIM card connector according to claim 1, wherein the SIM card connector further comprises a flip connected to the base in a rotating manner and configured to tightly lock the SIM card to the base.

10. A subscriber identity module (SIM) card connector, comprising:
a base having a bearer panel parallel to a SIM card,
a signal spring disposed on the base,
a detection apparatus configured to cooperate with one side of the SIM card and detect an action of the SIM card, the detection apparatus comprising:
a fixed contact secured to the base,
a detection spring having a first end secured to the base and a second end configured to perform clutch cooperation with the fixed contact by means of elastic deformation of the detection spring, and
a trigger part disposed on one side, close to the SIM card, of the detection spring;
wherein a protection board is further disposed on the base, the detection spring is located between the SIM card and the protection board, and the protection board performs gap cooperation with the second end of the detection spring; and
a controller electrically connected to the detection apparatus and to a power supply circuit of the signal spring, and wherein the trigger part is configured to press against one side of the SIM card to move the second end of the detection spring so that the controller changes a connectivity status of the power supply circuit of the signal spring.

11. A mobile terminal, comprising:
a subscriber identity module (SIM) card connector, comprising:
a base having a bearer panel parallel to a SIM card;
a signal spring disposed on the base;
a detection apparatus configured to cooperate with one side of the SIM card and detect an action of the SIM card, the detection apparatus comprising:
a fixed contact secured to the base,
a detection spring having a first end secured to the base and a second end configured to perform clutch cooperation with the fixed contact by means of elastic deformation of the detection spring, and
a trigger part disposed on one side, close to the SIM card, of the detection spring;
a controller electrically connected to the detection apparatus and to a power supply circuit of the signal spring, and wherein the trigger part is configured to press against one side of the SIM card to move the second end of the detection spring so that the controller changes a connectivity status of the power supply circuit of the signal spring; and
wherein the signal spring has a pressing part configured to elastically press against the SIM card, the trigger part is closer to the bearer panel than the signal spring, and the trigger part is closer to the bearer panel than the pressing part.

12. The mobile terminal according to claim 11, wherein the controller of the SIM card connector is a processor of the mobile terminal.

13. A mobile terminal, comprising:
a subscriber identity module (SIM) card connector, comprising:
a base having a bearer panel parallel to a SIM card;
a signal spring disposed on the base;
a detection apparatus configured to cooperate with one side of the SIM card and detect an action of the SIM card, the detection apparatus comprising:
a fixed contact secured to the base,
a detection spring having a first end secured to the base and a second end configured to perform clutch cooperation with the fixed contact by means of elastic deformation of the detection spring, and
a trigger part disposed on one side, close to the SIM card, of the detection spring;
wherein a protection board is further disposed on the base, the detection spring is located between the SIM card and the protection board, and the protection board performs gap cooperation with the second end of the detection spring; and
a controller electrically connected to the detection apparatus and to a power supply circuit of the signal spring, and wherein the trigger part is configured to press against one side of the SIM card to move the second end of the detection spring so that the controller changes a connectivity status of the power supply circuit of the signal spring.

* * * * *